United States Patent
Peiffer et al.

(10) Patent No.: US 12,476,659 B1
(45) Date of Patent: Nov. 18, 2025

(54) SYSTEM FOR SCALABLE ADAPTIVE DIGITAL BEAMFORMING IN A PHASED ANTENNA-ARRAY

(71) Applicant: Rockwell Collins, Inc., Cedar Rapids, IA (US)

(72) Inventors: Benjamin Peiffer, Cedar Rapids, IA (US); Jeremiah D. Wolf, Atkins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 301 days.

(21) Appl. No.: 18/242,708

(22) Filed: Sep. 6, 2023

(51) Int. Cl.
- *H04B 1/00* (2006.01)
- *H01Q 3/36* (2006.01)
- *H04B 7/0426* (2017.01)

(52) U.S. Cl.
CPC ............ *H04B 1/0003* (2013.01); *H01Q 3/36* (2013.01); *H04B 7/043* (2013.01)

(58) Field of Classification Search
CPC .... H04B 1/0003; H04B 7/043; H04B 7/0408; H04B 7/086; H04B 7/0417; H04B 7/0848; H04B 7/0456; H04B 7/0617; H04B 7/06952; H04B 7/0634; H04B 17/12; H04B 7/0682; H04B 17/221; H04B 7/0842; H04B 7/0897; H01Q 3/36; H01Q 3/26; H01Q 3/30; H01Q 3/24; H01Q 25/002; H01Q 3/38; H01Q 3/2605; H04W 16/28; H04W 72/046
See application file for complete search history.

(56) References Cited

U.S. PATENT DOCUMENTS

| | | |
|---|---|---|
| 5,771,439 A | 6/1998 | Kennedy, Jr. et al. |
| 7,250,903 B1 | 7/2007 | McDowell |
| 7,570,211 B1 | 8/2009 | Jensen et al. |
| 7,609,206 B1 | 10/2009 | Jensen et al. |
| 7,738,925 B2 | 6/2010 | Nguyen et al. |
| 9,640,866 B2 | 5/2017 | Kumar |
| 10,958,295 B2 | 3/2021 | Peng et al. |
| 11,217,897 B1 | 1/2022 | West et al. |
| 11,271,321 B1 | 3/2022 | West et al. |
| 11,469,501 B2 | 10/2022 | Tang et al. |
| 11,536,756 B2 | 12/2022 | Walker et al. |
| 2004/0174300 A1 | 9/2004 | Nakagawa |
| 2017/0164368 A1* | 6/2017 | Nishikawa ........... H04B 7/0617 |
| 2018/0049042 A1* | 2/2018 | Yu ...................... H04B 7/043 |
| 2018/0167127 A1* | 6/2018 | Ozaki ..................... H01Q 3/36 |
| 2020/0322940 A1* | 10/2020 | Pezeshki ............. H04W 72/046 |
| 2024/0064765 A1* | 2/2024 | Zhu ....................... H04B 7/0456 |
| 2024/0120652 A1* | 4/2024 | Salmani .................. H01Q 3/36 |

* cited by examiner

*Primary Examiner* — Lana N Le
(74) *Attorney, Agent, or Firm* — Suiter Swantz IP

(57) ABSTRACT

A radio system is used for adaptive digital beamforming in a phased antenna-array. The radio system scales with large numbers of antenna elements in a phased array. The radio system uses a distributed computing method that is inherently scalable with large numbers of the antenna elements. The radio system includes a digital beamformer. The digital beamformer is an analog combiner, digital beamformer. The digital beamformer includes element processing hardware (EPH) which perform the distributed computing.

19 Claims, 8 Drawing Sheets

SYSTEM FOR SCALABLE ADAPTIVE DIGITAL BEAMFORMING IN A PHASED ANTENNA-ARRAY

TECHNICAL FIELD

The present invention generally relates to radio systems, and more specifically to beamformers of the radio systems.

BACKGROUND

As radio frequency (RF) spectrum resource utilization increases, radio systems utilize higher frequencies and higher instantaneous bandwidths (IBW). Higher path loss at higher frequencies dictates the use of highly directional radio systems. The radio systems must achieve increasing beamforming gain when communicating at the higher frequencies. More beamforming gain requires more elements in an array while maintaining smaller lattice spacing at the wavelengths required for the higher frequencies. Signals arriving at each element must be correlated with all other signals.

Adaptive beamformers use one or more adaptive beamforming algorithms to perform the beamforming. For example, the adaptive beamforming algorithms include Multiple Signal Classification (MUSIC) and the like. MUSIC has an inherent requirement for centralized processing. The traditional adaptive beamforming algorithms, such as MUSIC, are also computationally intensive. As the number of elements increases, the computational complexity of the traditional beamforming algorithms increase by the number of elements cubed. The adaptive beamforming algorithms involve matrix covariance inversion. The covariance matrix correlates all the received signals. Calculating a covariance matrix is processor intensive. Adaptive digital beamforming lack scalability because inversion of large covariance matrices is computationally expensive. Thus, the adaptive beamforming algorithms do not scale well with the large number of antenna elements used by the adaptive beamformer. Also, since all signals must be available to correlate with all other signals, a common processor is required.

Digital beamformers must also perform calibration or synchronization across sub-arrays. The calibration or synchronization is performed to ensure phase coherence between the sub-arrays. The signal processing on the signals from subarrays has independent phase mismatches because the clocking of the analog to digital converter is not phase synchronized between subarrays. The subarrays must be calibrated to correct for the independent phase offsets. Thus, the digital beamformers must include calibration circuitry for each of the subarrays.

Therefore, it would be advantageous to provide a device, system, and method that cures the shortcomings described above.

SUMMARY

A digital beamformer is described. The digital beamformer includes a plurality of element processing hardware. Each of the plurality of element processing hardware comprise a plurality of analog-to-digital converters. The plurality of analog-to-digital converters generate a plurality of digital signals. Each of the plurality of element processing hardware comprise a digital phase shifter. The digital phase shifter multiplies the plurality of digital signals by a plurality of beamforming weights. The digital phase shifter sums the plurality of digital signals in response to multiplying by the plurality of beamforming weights to generate a summed digital signal. Each of the plurality of element processing hardware comprise a digital-to-analog converter. The digital-to-analog converter converts the summed digital signal to a summed analog signal. The digital beamformer includes a radio frequency combiner. The radio frequency combiner combines the summed analog signal from each of the plurality of element processing hardware to generate a combined analog signal. The digital beamformer includes a beam processing hardware. The plurality of element processing hardware converts the combined analog signal to a combined digital signal. The beam processing hardware generates a global feedback based on the combined digital signal. The digital phase shifter of each of the plurality of element processing hardware adapts the plurality of beamforming weights based on the global feedback.

In some embodiments, the plurality of beamforming weights are complex numbers. The digital phase shifter changes both an amplitude and a phase of the plurality of digital signals when multiplying the plurality of digital signals by the beamforming weights.

In some embodiments, adapting the plurality of beamforming weights changes the amplitude and the phase of the plurality of digital signals.

In some embodiments, the digital phase shifter of each of the plurality of element processing hardware generate local feedback from the summed digital signal. The digital phase shifter of each of the plurality of element processing hardware adapts the plurality of beamforming weights based on the global feedback and the local feedback.

In some embodiments, the digital phase shifter iteratively adapts the plurality of beamforming weights for each of the plurality of digital signals as the plurality of digital signals are received from the plurality of analog-to-digital converters in real-time.

In some embodiments, each of the plurality of element processing hardware comprise a band-storage memory. The plurality of digital signals are stored in the band-storage memory. The digital phase shifter iteratively adapts the beamforming weights for the plurality of digital signals stored in the band-storage memory.

In some embodiments, each of the plurality of element processing hardware comprise a local oscillator. The local oscillator generates a clock signal. The plurality of analog-to-digital converters and the digital-to-analog converter each use the clock signal for timing.

In some embodiments, the clock signal for each of the plurality of element processing hardware are not synchronized.

In some embodiments, the plurality of element processing hardware are not in communication.

In some embodiments, the digital phase shifter of each of the plurality of element processing hardware adapts the plurality of beamforming weights using an optimization algorithm.

In some embodiments, the optimization algorithm comprises one of a gradient ascent algorithm, a gradient descent algorithm, a machine learning algorithm, or a pseudo-random guesses algorithm.

In some embodiments, the plurality of element processing hardware independently perform the optimization algorithm to adapt the plurality of beamforming weights.

In some embodiments, the combined digital signal comprises a radiation pattern comprising a plurality of nulls and a plurality of beams. The digital phase shifter adapts the plurality of beamforming weights to form the plurality of beams and the plurality of nulls.

In some embodiments, the digital beamformer is configured to simultaneously steer the plurality of beams and the plurality of nulls in azimuth and in elevation.

In some embodiments, the digital beamformer multiplexes the plurality of beams across frequency. The digital phase shifter comprises a polyphase filter bank.

In some embodiments, each of the plurality of element processing hardware comprise a plurality of the analog-to-digital converters. The digital beamformer comprises a plurality of the radio frequency combiners. The plurality of radio frequency combiners are coupled to respective of the plurality of analog-to-digital converters.

A radio system is described. The radio system includes an antenna array. The radio system includes a digital beamformer. The digital beamformer includes a plurality of element processing hardware. Each of the plurality of element processing hardware comprise a plurality of analog-to-digital converters. The plurality of analog-to-digital converters generate a plurality of digital signals. Each of the plurality of element processing hardware comprise a digital phase shifter. The digital phase shifter multiplies the plurality of digital signals by a plurality of beamforming weights. The digital phase shifter sums the plurality of digital signals in response to multiplying by the plurality of beamforming weights to generate a summed digital signal. Each of the plurality of element processing hardware comprise a digital-to-analog converter. The digital-to-analog converter converts the summed digital signal to a summed analog signal. The digital beamformer comprises a radio frequency combiner. The radio frequency combiner combines the summed analog signal from each of the plurality of element processing hardware to generate a combined analog signal. The digital beamformer comprises a beam processing hardware. The plurality of element processing hardware converts the combined analog signal to a combined digital signal. The beam processing hardware generates a global feedback based on the combined digital signal. The digital phase shifter of each of the plurality of element processing hardware adapts the plurality of beamforming weights based on the global feedback.

In some embodiments, the radio system comprises a software defined radio. The software defined radio is coupled to the digital beamformer.

In some embodiments, the radio system comprises a radio frequency front end. The radio frequency front end is coupled between the antenna array and the digital beamformer.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
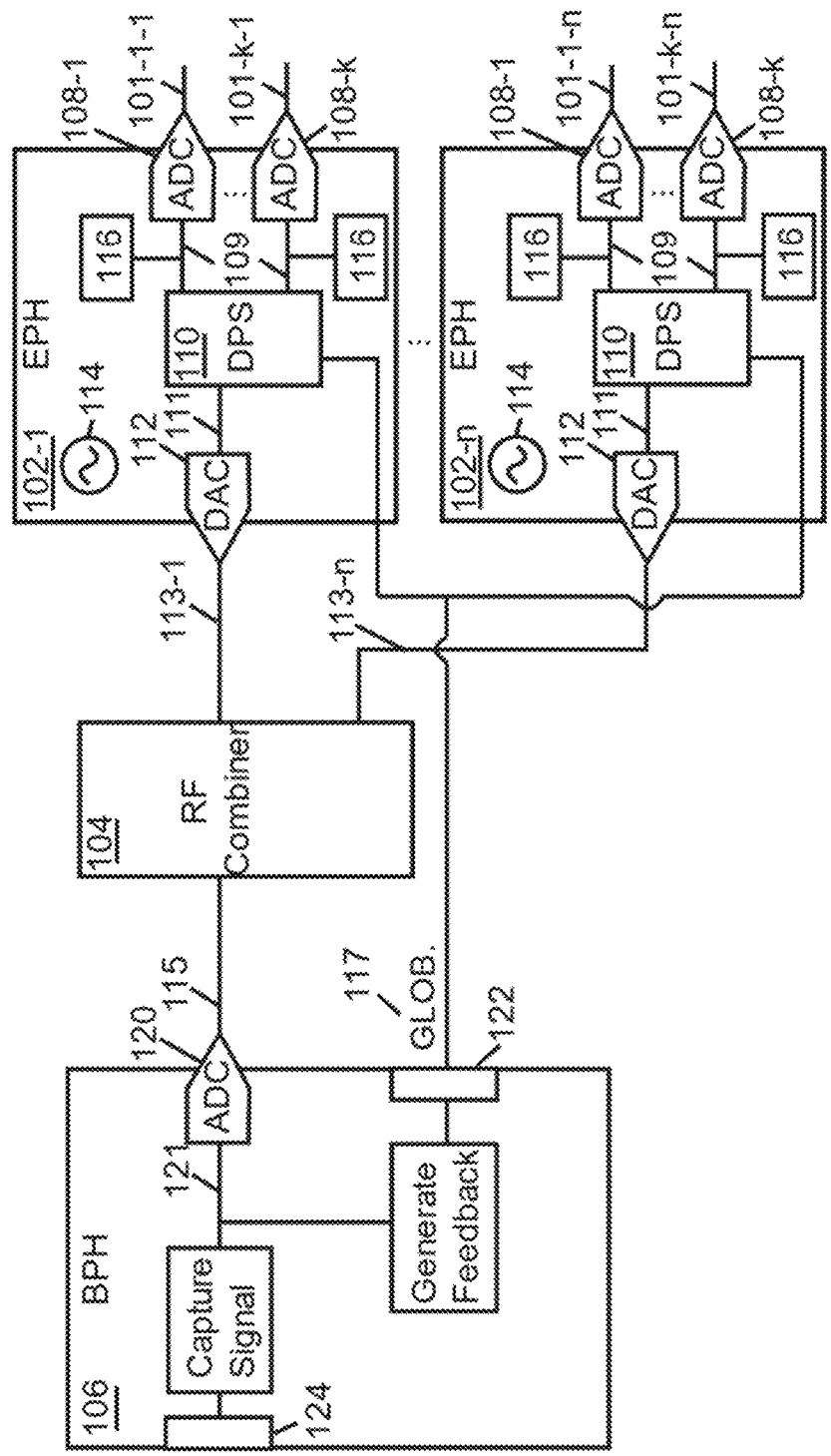
FIG. 1A depicts a block diagram of a digital beamformer, in accordance with one or more embodiments of the present disclosure.
Figure 1B:
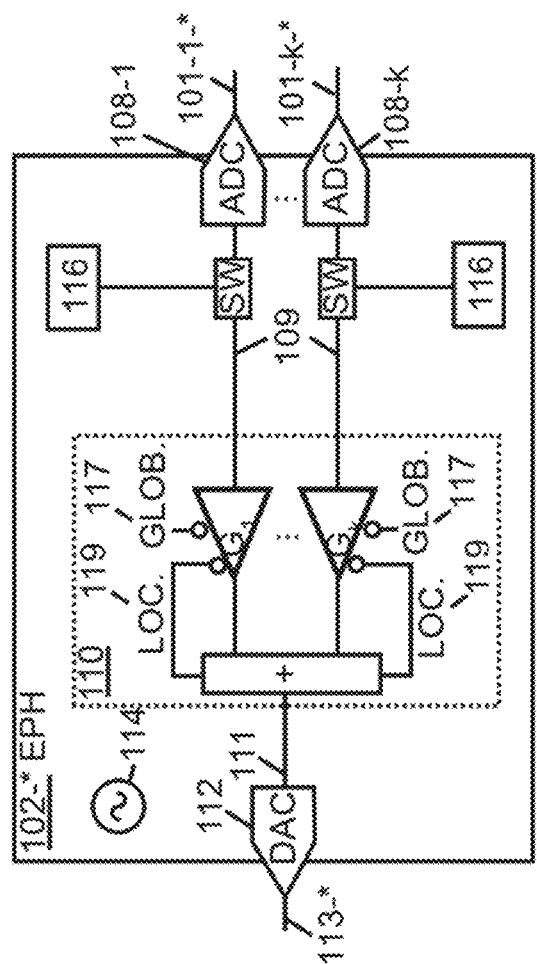
FIG. 1B depicts a block diagram of an element processing hardware of the digital beamformer of FIG. 1A, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a radio system. The radio system is used for adaptive digital beamforming in a phased antenna-array. The radio system scales with large numbers of antenna elements in a phased array. The radio system uses a distributed computing method that is inherently scalable with large numbers of the antenna elements.

The radio system includes a digital beamformer. The digital beamformer is an analog combiner, digital beamformer. The digital beamformer includes element processing hardware (EPH) which perform the distributed computing. The EPH iteratively perform digital beamforming on signals received from the antenna elements. The EPH receives global feedback, the global feedback indicating whether the signal has improved or worsened over the previous signal. The EPH then adapts the current iteration according to the global feedback. The system also includes a radio frequency (RF) combiner. The RF combiner combines analog signals received from the EPH. Notably, the EPH are distributed such that the digital beamforming is performed before the analog combining. The system also includes a beam processing hardware (BPH). The BPH captures the signals from the RF combiner and generates the global feedback.

The radio system improves at least the following aspects of digital beamformers for large arrays: 1) processing at the antenna element is simple and occurs independently; 2) calibration of phase offsets is not required; 3) the beam-bandwidth product is not limited by a digital interface; and 4) the beamformer requires relatively few resources.

U.S. Pat. No. 7,609,206, titled "Enabling digital beamforming techniques for RF systems having short repetitive synchronization sequences"; U.S. Pat. No. 7,570,211, titled "Digital beamforming method and apparatus for pointing and null steering without calibration or calculation of covariance matrix"; U.S. Pat. No. 11,217,897, titled "Antenna system and method with a hybrid beamformer architecture"; U.S. Pat. No. 5,771,439, titled "Adaptive antenna system and method for cellular and personal communication systems"; U.S. Pat. No. 11,469,501, titled "Beam steerable antenna system, method of manufacturing thereof and method of beam steering an antenna array"; U.S. Pat. No. 10,958,295, titled "Complex domain beamforming system and methods relating thereto"; are incorporated herein by reference in the entirety.

Referring now to FIGS. 1A-1D, a digital beamformer 100 is described, in accordance with one or more embodiments of the present disclosure. The digital beamformer 100 includes one or more components, such as, but not limited to, element processing hardware (EPH 102), RF combiner 104, beam processing hardware (BPH 106), and the like.

The digital beamformer 100 includes the EPH 102. For example, the digital beamformer 100 includes a plurality of EPH 102-1 . . . n, where n is an integer of at least two. The number (n) of the EPH 102 is selected based on the number of channels and the number of channels per EPH. For example, the number (n) of the EPH 102 is the number of subarrays of an antenna array. The term the EPH 102 and the plurality of EPH 102-1 . . . n may be used synonymously herein. The EPH 102 may also be referred to as a subarray beamformer or the like. The EPH 102 beamforms signals from a subarray of antenna elements in an antenna array.

The EPH 102 receives a plurality of the analog signals 101. For example, the EPH 102 receives a number (k*n) of the analog signals 101 (i.e., analog signal 101-1-1 through 101-$k$-$n$), where n is an integer referring to the number of EPH 102, where k is an integer referring to the number of ADC 108 per EPH 102. In some embodiments, the number of analog signals 101 is based on a design of a phased array to which the digital beamformer 100 is coupled. The EPH 102 includes one or more channels. The channels correspond to the number of the analog signals 101 received by the EPH 102 (i.e., the number of antenna elements connected to the EPH 102). In some embodiments, the EPH 102 each include at least two of the channels. Including multiple of the channels for the EPH 102 may be desirable to reduce the costs of the digital beamformer 100. For example, the EPH 102 includes a number (k) of channels, where k is an integer of two or greater. The EPH 102 may also be referred to as a k-channel EPH 102. In some embodiments, each of the EPH 102 include the same number (k) of channels per EPH 102.

The EPH 102 each includes one or more components, such as, but not limited to, analog-to-digital converters (ADC 108), digital phase shifter 110 (DPS), digital-to-analog converters (DAC 112), local oscillator 114, band-storage memory 116, and the like.

The EPH 102 each include a plurality of the ADC 108. The ADC 108 may also be referred to as channel ADC. For example, the EPH 102 include the ADC 108 for each of the channels. The number of ADCs 108 corresponds to the number of antenna elements served by the EPH 102. The ADC 108 are connected to antenna elements. For example, the ADC 108 may be directly connected to the antenna elements or coupled via an RF front end. The EPH 102 may each include at least two of the ADCs 108. The ADC 108 receive the analog signals 101. The plurality of ADC 108 generate a plurality of digital signals 109. The ADC 108 converts the analog signals 101 to digital signals 109. The digital signal 109 is a complex number. For example, the digital signal 109 includes a real component (i.e., in-phase or I) and an imaginary component (i.e., quadrature or Q). The real component is between 0 and 1.

The EPH 102 each include the digital phase shifter 110. The digital phase shifter 110 may also be referred to a digital beamforming network, combination network, multiplier/adder, or the like. The digital phase shifter 110 is coupled to the ADC 108. The digital phase shifter 110 receives the plurality of digital signal 109 from the plurality of ADC 108.

In some embodiments, the digital phase shifter 110 adjust a phase and an amplitude of the digital signals 109. The digital phase shifter 110 adjusts the phase and the amplitude of the digital signals 109 to be in-phase (e.g., reduce a phase difference) or to be out-of-phase (e.g., increase a phase difference).

The digital phase shifter 110 adjusts the phase and the amplitude of the digital signals 109 by multiplying the digital signals 109 by beamforming weights (G). The beamforming weights may also be referred to as beam steering coefficients. Each of the digital signals 109 (i.e., digital signal 109-1 through digital signal 109-$k$) is multiplied by a corresponding beamforming weight (i.e., digital signal $G_1$ through $G_k$). The beamforming weights are complex numbers. For example, the beamforming weights includes a real component (i.e., in-phase or I) and an imaginary component (i.e., quadrature or Q). The digital phase shifter 110 changes both the amplitude and the phase of the digital signals 109 when multiplying the digital signals 109 by the beamforming weights.

The digital phase shifter 110 sums the digital signals 109 in response to multiplying the digital signal 109 by the beamforming weight. The sum of the of digital signals 109 (i.e., k complex numbers) is between 0 (i.e., a null) and k (i.e., a beam). The digital phase shifter 110 sums the digital signals 109 to generate a summed digital signal 111. For example, the summed digital signal 111 may have an in-phase value of 0 (i.e., a null) or k (i.e., a beam). The summed digital signal 111 may also be referred to as a summed and phase-shifted digital signal, a phase-shifted digital signal, a digitized received beam, and the like.

In some embodiments, the digital phase shifter 110 adapts the beamforming weights. Adapting the beamforming weights changes the amplitude and the phase of the summed digital signal 111. The adapting is performed to reduce unwanted signals and/or emphasize desired signals in the summed digital signal and/or the combined digital signal 121. The digital phase shifter 110 adapts the beamforming weights to control a radiation pattern of the summed digital signal and/or the combined digital signal 121. The digital beamformer 100 is an adaptive beamformer due to the digital phase shifter 110. Notably, the digital beamformer 100 does not perform time delays or phase shifts on analog signals. In this regard, the digital beamformer 100 is a digital beamformer and not an analog beamformer or a hybrid beamformer.

The digital phase shifter 110 receives global feedback 117. The digital phase shifter 110 receives the global feedback 117 from the BPH 106. The digital phase shifter 110 adapts the beamforming weights using the global feedback 117. The global feedback 117 causes the beamforming weights to change the phase shift and amplitude. For example, the global feedback 117 causes the beamforming weights to adapt to form the beams and/or nulls.

In some embodiments, the digital phase shifter 110 generates local feedback 119. For example, the digital phase shifter 110 generates local feedback 119 from the summed digital signal 111. The local feedback 119 may also be referred to as subarray feedback.

The digital phase shifter 110 adapts the beamforming weights using the global feedback 117 and the local feedback 119. The global feedback 117 and the local feedback 119 causes the beamforming weights to change the amplitude and phase shift. For example, the global feedback 117 and the local feedback 119 causes the beamforming weights to adapt to form the beams and/or nulls. It is contemplated that adapting the beamforming weights using the global feedback 117 and the local feedback 119 may cause the digital phase shifter 110 to achieve a desired radiation pattern more rapidly than adapting the beamforming weights only using the global feedback 117. For example, the local feedback 119 may make the optimization algorithm converge faster and reduce the number of iterations of receiving the global feedback 117.

In some embodiments, each of the EPH 102 independently multiply the digital signals 109 by the beamforming weights. The EPH 102 separately generate one or more beams and/or one or more nulls. The beams and/or nulls generated by the EPH 102 may also be steered at different elevation and azimuth from beams and/or nulls generated by others of the EPH 102. The plurality of EPH 102 are not in communication. For example, the local feedback 119 does not leave the EPH 102. In this regard, each of the EPH 102 are independent from each other. The EPH 102 do however receive the global feedback 117 and generate the local feedback 119.

The digital phase shifter 110 adapts the beamforming weights to form beams and/or nulls in the combined digital signal 121. For example, the digital phase shifter 110 adapts the beamforming weights to form beams in the radiation pattern for maximizing the reception of desired signal. It is desirable to achieve radiation patterns with beams which include gain as close to 0 dB as possible. By way of another example, the digital phase shifter 110 adapts the beamforming weights to form nulls in the radiation pattern for minimizing the reception of undesired signals. The nulls are the opposite of the beams. It is desirable to achieve radiation patterns with nulls which have gain which is highly negative in dB. The digital beamformer 100 may be considered an adaptive beamformer, in that the beamforming weights are adapted based on the global feedback 117.

In some embodiments, the EPH 102 adapts the beamforming weights using on an optimization algorithm. The distributed optimization algorithm uses the global feedback 117 to adapt the beamforming weights. In some embodiments, the distributed optimization algorithm uses the global feedback 117 and the local feedback 119 to adapt the beamforming weights.

The optimization algorithm may include, but is not limited to, a gradient ascent algorithm, gradient descent algorithm, machine learning algorithm (e.g., reinforcement learning algorithm), pseudo-random guesses algorithm, and the like. For example, the machine learning algorithm may be a reinforcement learning algorithm. The reinforcement learning algorithm may receive rewards from the global feedback 117 and/or the local feedback 119 when the beamforming weights cause a beam and/or null.

The optimization algorithm is distributed between each of the EPH 102. In this regard, the plurality of EPH 102 independently perform the optimization algorithm to adapt the plurality of beamforming weights. The digital beamformer 100 may reduce the number of channels per EPH 102 by increasing the number of EPH 102 per digital beamformer 100. Reducing the number of channels per EPH 102 may reduce the complexity of the beamforming algorithm. Thus, the digital beamformer 100 is highly scalable with increasing numbers of antenna elements, channels, and analog signals 101 by scaling the number of EPH 102.

The EPH 102 each include one or more digital-to-analog converters (DAC 112). The DAC 112 may also be referred to as beamformer DAC. The DAC 112 are connected to the digital phase shifter 110. The DAC 112 receives the summed digital signal 111 from the digital phase shifter 110. The DAC 112 converts the summed digital signal 111 to the analog domain. In particular, the DAC 112 converts the summed digital signal to a summed analog signal 113. The DAC 112 are connected to the RF combiner 104. The DAC 112 pass the summed digital signal 111 to the RF combiner 104.

The EPH 102 includes the local oscillator 114. The local oscillator 114 generates a clock signal. The clock signal is used by the various components of the EPH 102 for timing. For example, the ADC 108, the digital phase shifter 110, the DAC 112, and the band-storage memory 116 each use the clock signal for timing. Thus, the ADC 108, the digital phase shifter 110, the DAC 112, and the band-storage memory 116 operate on the same clock-domain. The clock-domain between each of the EPH 102 may vary due to error in the clock signal. The clock signal may introduce phase error to the ADC 108 and the DAC 112. The EPH 102 has a conjugate phase error between the ADC 108 and the DAC 112. The EPH 102 is inherently phase coherent. The EPH 102 is inherently phase coherent because phase offsets introduced from the analog signals 101 to the digital signals 109 by the ADC 108 are corrected by the DAC 112 converting the summed digital signal 111 to the summed analog signals 113. The digital beamformer 100 does not need to perform calibration and synchronization of the clock signals between each of the EPH 102 to ensure phase coherence. The clock signal for each of the plurality of EPH 102 are not synchronized. Thus, the DAC 112 converting back to the analog domain of data in the same clock-domain as the ADC 108 removes the requirement for on-line calibration/synchronization of the clock signals of the EPH 102.

The digital beamformer 100 includes RF combiner 104. The RF combiner 104 may also be referred to as a RF power combiner, an RF splitter, RF splitter/combiner and the like. The RF combiner 104 is coupled to the EPH 102. The RF combiner 104 receives the analog signals 113 from each of the EPH 102. The RF combiner 104 may also be referred to as an n-way combiner where n is the number of the EPH 102. The RF combiner 104 enables high scalability. For example, the digital beamformer 100 may have thousands of the EPH 102 connected to the RF combiner 104.

The RF combiner 104 combines the analog signals 113. The RF combiner 104 combines the analog signals 113 to generate the combined analog signal 115. The combined analog signal 115 has a radiation pattern with multiple beams and nulls. The RF combiner 104 is coupled to the BPH 106. The RF combiner 104 provides the combined analog signal 115 to the BPH 106.

The RF combiner 104 is intended to encompass both a single RF combiner and a cascade of plurality of RF combiners. In some embodiments, the RF combiner 104 is a single RF combiner (as depicted). The single RF combiner may include the n connections for the EPH 102. In some embodiments, the RF combiner 104 is a cascade of plurality of RF combiners (not depicted). The plurality of RF combiners may individually have fewer than n connections. The plurality of RF combiners are cascaded to achieve the desired number of connections for the EPH 102. A plurality of RF combiners may be cascaded to achieve the n-way combiner. It is contemplated that the RF combiner 104 being the cascade of plurality of RF combiners may be necessary where the number (n) of the EPH 102 are in the hundreds or thousands.

The RF combiner 104 enables significantly higher beam-bandwidth product than an equivalent digital interface. State-of-the-art digital serial transceivers can move ~50 Gb/s of data per serial lane. This is equivalent to ~1.5 GHz of RF instantaneous bandwidth (IBW). State of-the-art data converters can convert data at between 5 giga-samples per second (GS/s) and 64 GS/s (2.5-32 GHz of RF IBW). Thus, the RF combiner 104 may experience a greater than 1.6 times increase in beam-bandwidth product per lane.

The analog combining is performed after the EPH 102 performing the phase shifts on the digital signals. In this regard, the digital beamformer 100 may be referred to as an analog combiner, digital beamformer. The RF combiner 104 after performing the digital beamforming is unlike hybrid beamforming. Additionally, the digital beamformer 100 is a distributed beamformer. In this regard, the time delays or phase shifts on the digital signals 109 are performed by the plurality of the EPH 102 which simultaneously adjust the phase and the amplitude which are subsequently combined by the RF combiner 104 constructively to form beams and/or destructively to form nulls.

The digital beamformer 100 includes beam processing hardware (e.g., BPH 106). The BPH 106 includes one or more components, such as, but not limited to, an ADC 120, a digital interface 122, a digital interface 124, and the like.

The BPH 106 includes an ADC 120. The ADC 120 is coupled to the RF combiner 104. The ADC 120 receives the combined analog signal 115. The ADC 120 converts the combined analog signal 115 to a combined digital signal 121.

The BPH 106 captures the combined digital signal 121. Capturing may also be referred to as detecting. Capturing the combined digital signal 121 may be achieved in a variety of ways, depending on the signal of interest. For example, the BPH 106 may include a correlator. The correlator may capture the combined digital signal 121. The BPH 106 may correlator may capture the combined digital signal 121 by correlating the combined digital signal 121 with a signal of interest. In some embodiments, the BPH 106 capture jamming signals. The jamming signal may be a signal with a signal-to-noise ratio which is easy to detect. The global feedback 117 may cause the EPH 102 to generate nulls directed to the jamming signal. The BPH 106 may also capture signals where a transmitter node does not which to be found. The detection scenario where the transmitter node does not which to be found is not described herein.

The BPH 106 also generates the global feedback 117. The BPH generates the global feedback 117 based on combined digital signal 121. The combined digital signal 121 includes a radiation pattern. The radiation pattern includes one or more beams and/or nulls. The global feedback 117 indicates whether the beamforming weights of the EPH 102 produce a desired radiation pattern in the combined digital signal 121. For example, the global feedback 117 indicates whether beams and nulls were formed correctly once all the elements are combined. The BPH 106 wants the combined signal to be either stronger or weaker. To determine the global feedback 117, the BPH 106 compares the current iteration of the combined digital signal 121 to the previous iteration of the combined digital signal 121. The global feedback 117 indicates whether the current iteration of the combined digital signal 121 has improved or worsened over the previous iteration of the combined digital signal 121. The beamforming weights are then adapted to change the radiation pattern of the combined digital signal 121.

In some embodiments, the digital beamformer 100 is configured to steer the beams and/or the nulls in azimuth and/or elevation. For example, the digital beamformer 100 is configured to steer the beams and/or the nulls in azimuth and/or elevation by changing the global feedback 117. The digital beamformer 100 may simultaneously steer plurality of beams and/or the plurality of nulls in azimuth and/or in elevation.

The nature of the global feedback 117 depends on the optimization algorithm implemented by the EPH 102. In some embodiments, the global feedback 117 provides 1-bit of feedback. For example, the bit may tell the digital phase shifter 110 whether a current of the combined digital signal 121 is improved or worsened over a previous of the combined digital signal 121. In some embodiments, the global feedback 117 provides rich feedback. For example, the rich feedback may include a percentage. The percentage may indicate improvement by the percentage. The global feedback 117 may be a normalized value between zero and one to represent the percentage improvement.

The BPH 106 is coupled to the EPH 102. The BPH 106 provides the global feedback to the EPH 102. For example, the BPH 106 is coupled to the EPH 102 by one or more control buses. The control buses can be analog or digital control buses. For example, the BPH 106 may include a digital interface 122. The digital interface 122 is coupled to the one or more digital control buses. In some embodiments, the digital interface 122 is a low-latency digital interface.

In some embodiments, the digital beamformer 100 may include a single bus from the BPH 106 to the EPH 102 for the global feedback. The global feedback 117 is then broadcast to each of the EPH 102. In some embodiments, the global feedback is time sliced on the single bus. The global feedback 117 is time sliced to provide feedback to each of the EPH 102 individually. For example, a first time slice may be for the first EPH 102-1, and so on for each of the EPH 102. In some embodiments, the global feedback 117 tells the EPH 102 to which DAC 112 the global feedback corresponds and/or to which beam the global feedback 117 corresponds. In some embodiments, the digital beamformer 100 includes a separate bus from BPH 106 to each of the EPH 102.

In some embodiments, the global feedback 117 is a low-latency global feedback signal. The global feedback 117 may be in the form of a digital signal (e.g., high-speed digital signal) or analog signal.

In some embodiments, the digital phase shifter 110 iteratively adapts the beamforming weights (i.e., $G_1$ to $G_k$) for each of the digital signals 109. The digital phase shifter 110 iteratively adapts the beamforming weights to improve the quality of the beams and nulls. The digital phase shifter 110 iteratively adapts the beamforming weights using the global feedback 117 and/or the local feedback 119. Adaption at each iteration are based upon the global feedback 117, which correspond to each beam or null formed by the EPH 102 collectively. The EPH 102 applies a beamforming weight to the digital signals 109 in accordance with the current iteration of the global feedback 117. Adaption at each iteration are also based upon the local feedback 119, which correspond to each beam or null formed by the EPH 102 generating the local feedback 119. The BPH 106 updates the global feedback for the current iteration of the combined digital signal 121. The process then repeats with the EPH 102 by adapting the beamforming weights and multiplying the digital signals 109 by beamforming weights in accordance with the current iteration of the global feedback 117 and the local feedback 117.

The time of each iteration is limited by a duration of how long the signal takes to multiply the digital signals 109 by beamforming weights, go through the DAC 112, the RF combiner 104, the ADC 120, generate the global feedback 117, return the global feedback 117 to the EPH 102, and update the beamforming weights based on the global feedback. It is contemplated that each iteration may occur in a millisecond or less. Distributing the beamforming to the EPH 102 is beneficial to remove the computational intensity of traditional beamforming algorithms, such as MUSIC, at the cost of the time required to perform the iterations.

In some embodiments, the digital phase shifter 110 iteratively adapts the beamforming weights for each of the digital signals 109 as the digital signals 109 are received from the ADC 108 in real-time. For example, the digital signals 109 may be originated from a transmitter node. The transmitter node may transmit a short burst 4 times per second. The digital signals 109 may be are received from the ADC 108 at a rate of 4 Hz (e.g., received by antenna elements connected to EPH 102 as the analog signals 101 which are subsequently converted to the digital signals 109 by the ADC 108). Waiting for the transmitter to transmit several hundred times to perform several hundred iterations may be relatively slow. Iteratively adapting the beamforming weights for each of the digital signals 109 as the digital signals 109 are received in real time may be relatively slow. For example, the digital beamformer 100 may perform several hundred iterations. In the instance described above, waiting for the transmitter node to transmit two-hundred hundred times at a rate of 4 Hz may take 50 seconds or more.

In some embodiments, each of the plurality of EPH 102 includes the band-storage memory 116. The band-storage memory 116 stores the digital signals 109. For example, the EPH 102 may include a switch coupled between the ADC 108 and the digital phase shifter 110. The switch may divert the digital signals 109 from the ADC 108 to the band-storage memory 116. The EPH 102 may store a duration of the digital signals 109. For example, the EPH 102 may store a 10-millisecond duration of the digital signals 109.

In some embodiments, the digital phase shifter 110 iteratively adapts the beamforming weights for the digital signals 109 stored in the band-storage memory 116. In this regard, the EPH 102 may iterate on the same digital signals. Once the EPH 102 has observed the transmitter transmitting once, the EPH 102 records the digital signals 109 and may then form the beams and nulls directed at the transmitter node based on the one transmission.

Iteratively adapting the beamforming weights for the digital signals 109 stored in the band-storage memory 116 may be desirable to reduce a time between the iterations. For example, the EPH 102 may perform the iterations even when the transmitter node is not transmitting. For instance, the EPH 102 may perform two-hundred iterations on digital signal 109 stored in the band-storage memory 116 on the order of hundreds of milliseconds or less.

In some embodiments, the digital beamformer 100 includes one or more modes. In some embodiments, the digital beamformer 100 may include a search mode. The search mode may be used when trying to discover a transmitter node. The search mode may cause the digital beamformer 100 to record the digital signals 109 in the band-storage memory 116. The digital beamformer 100 then iteratively adjusts the beamforming weights and applies the beamforming weights to the digital signals 109 in the band-storage memory 116. In some embodiments, the digital beamformer 100 may include a track mode. The track mode may be used when the location of the transmitter node is known. The search mode may cause the digital beamformer 100 to iteratively adapt the beamforming weights for each of the digital signals 109 as the digital signals 109 are received from the ADC 108 in real time. In this regard, the iterations in the search mode are performed more rapidly than the iterations in the track mode. Additionally, iteratively adjusting the beamforming weights based on the digital signals 109 in the band-storage memory 116 is not useful in the track mode.

In some embodiments, the EPH 102 performs sub-iterations with the local feedback 117 during each iteration of the global feedback 119. A sub-iteration refers to the EPH 102 sub-iteratively adapting the beamforming weights, applies the beamforming weights to the digital signals 109, and updates the local feedback 117 before iteratively updating the global feedback 117. Notably, the sub-iteration is performed on the digital signals 109 which are received from the ADC 108, stored in band-storage memory 116, and then retrieved from the band-storage memory 116 during each sub-iteration. The sub-iterations during one of the iterations are thus performed on the same digital signal. The number of sub-iterations may be selected based on the duration of the iteration and the duration of the sub-iterations. For example, the duration of the sub-iterations may be much less than the duration of the iterations due to all the sub-iterations being performed digitally. The EPH 102 may then iteratively adapts the beamforming weights for each of the digital signals 109 as the digital signals 109 are received from the ADC 108 in real time and/or iteratively adapts the beamforming weights for the digital signals 109 stored in the band-storage memory 116.

In some embodiments, the BPH 106 includes the digital interface 124. The digital interface 124 may include a high-speed digital interface. The digital interface 124 may output the combined digital signal 121. The digital interface 124 is configured to couple to a software defined radio (SDR), or the like.

Figure 1C:
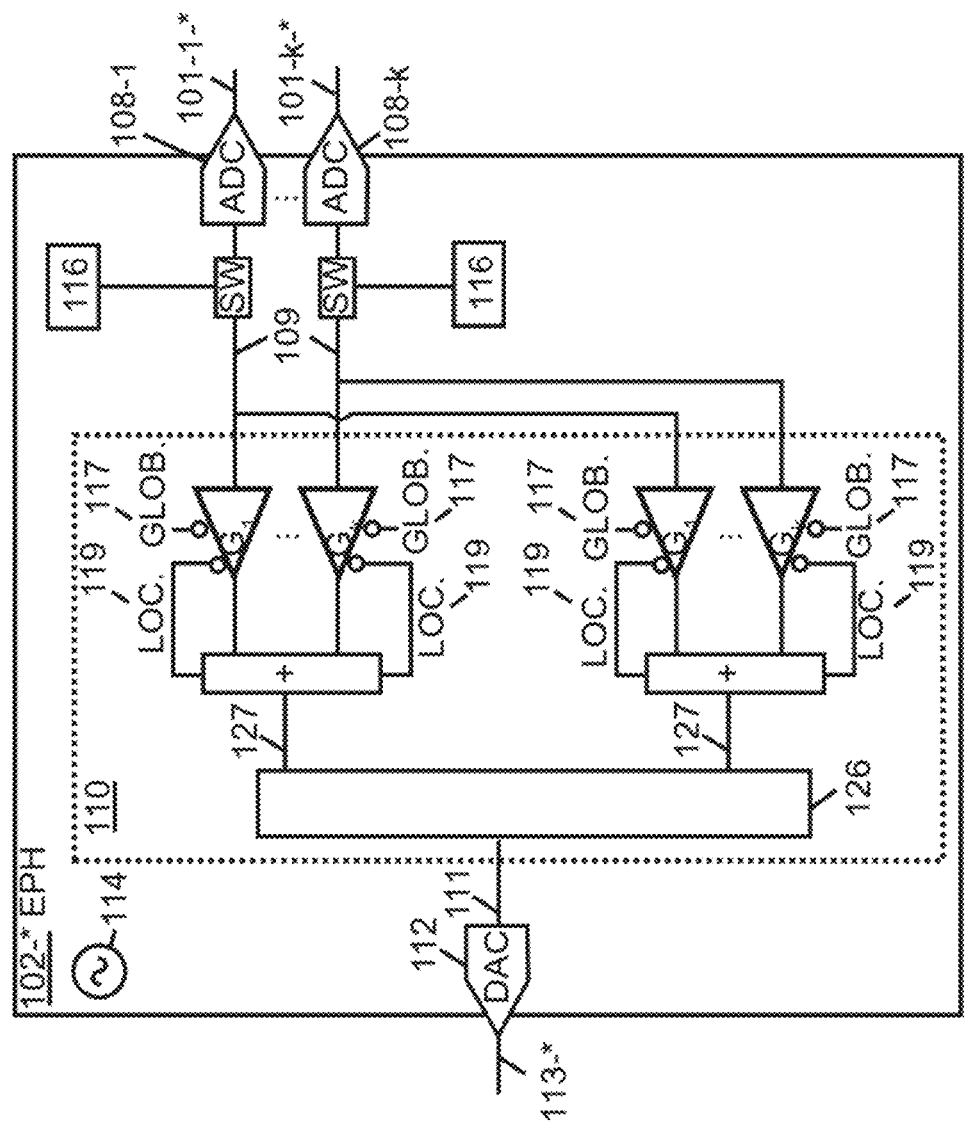
FIG. 1C depicts a block diagram of an element processing hardware of the digital beamformer of FIG. 1A, in accordance with one or more embodiments of the present disclosure.

Referring now in particular to FIG. 1C. In some embodiments, the digital beamformer 100 may multiplex the beams across frequency. In some embodiments, the digital phase shifter 110 independently applies the beamforming weights (e.g., $G_{1,1}$ through $G_{k,m}$) to the digital signals 109. The digital phase shifter 110 independently applies the beamforming weights to the digital signals 109 to generate a number (m) of pre-multiplexed digital signals 127, where m is an integer. The digital phase shifter 110 may form multiple beams simultaneously by which independently applies the beamforming weights to generate the pre-multiplexed digital signals 127. Each of the pre-multiplexed digital signals 127 includes a separate beam. The pre-multiplexed digital signals 127 may include equidistant sub-bands.

The digital phase shifter 110 may include a polyphase filter bank 126. The polyphase filter bank 126 may also be referred to as a polyphase quadrature filter. The polyphase filter bank 126 has a number (m) of channels. The polyphase filter bank 126 receives the pre-multiplexed digital signals 127. The polyphase filter bank 126 may perform a frequency translation of the pre-multiplexed digital signals 127. The polyphase filter bank 126 combines the pre-multiplexed digital signals 127 into the summed digital signals 111. The summed digital signals 111 may thus include multiple beams multiplexed together. The summed digital signals 111 includes multiple beams which are spread across frequency. The beams may be multiplexed across frequency because the beamforming is performed by the digital phase shifter 110 in the digital domain.

The DAC 112 receives the summed digital signals 111. For example, the DAC 112 may have 8 gigahertz of bandwidth. The EPH 102 may form 8 sets of 1 gigahertz beams. The EPH 102 may multiplex the 8 sets of 1 gigahertz beams into the bandwidth of the DAC 112. Thus, the EPH 102 may multiplex at least two beams on the DAC 112. The DAC 112 may then convert the summed digital signals 111 into the summed analog signals 113.

In some embodiments, the EPH 102 may spatially multiplex the beams in azimuth and/or elevation. An example is described with two beams. In this example, the EPH 102 may simultaneously point a first beam at 90 degrees in azimuth and point a second beam 70 degrees in azimuth. The EPH 102 filtering in space to those two directions at the ADC 108. The digital phase shifter 110 then maps the 90 and 70 degrees onto those sub-bands of the DAC 112. The beam-bandwidth product is the total number of beams times the bandwidth of those beams that may be handled by the digital beamformer 100. The beam-bandwidth product is the IBW of the DAC 112 times the number of DACs 112.

Figure 1D:
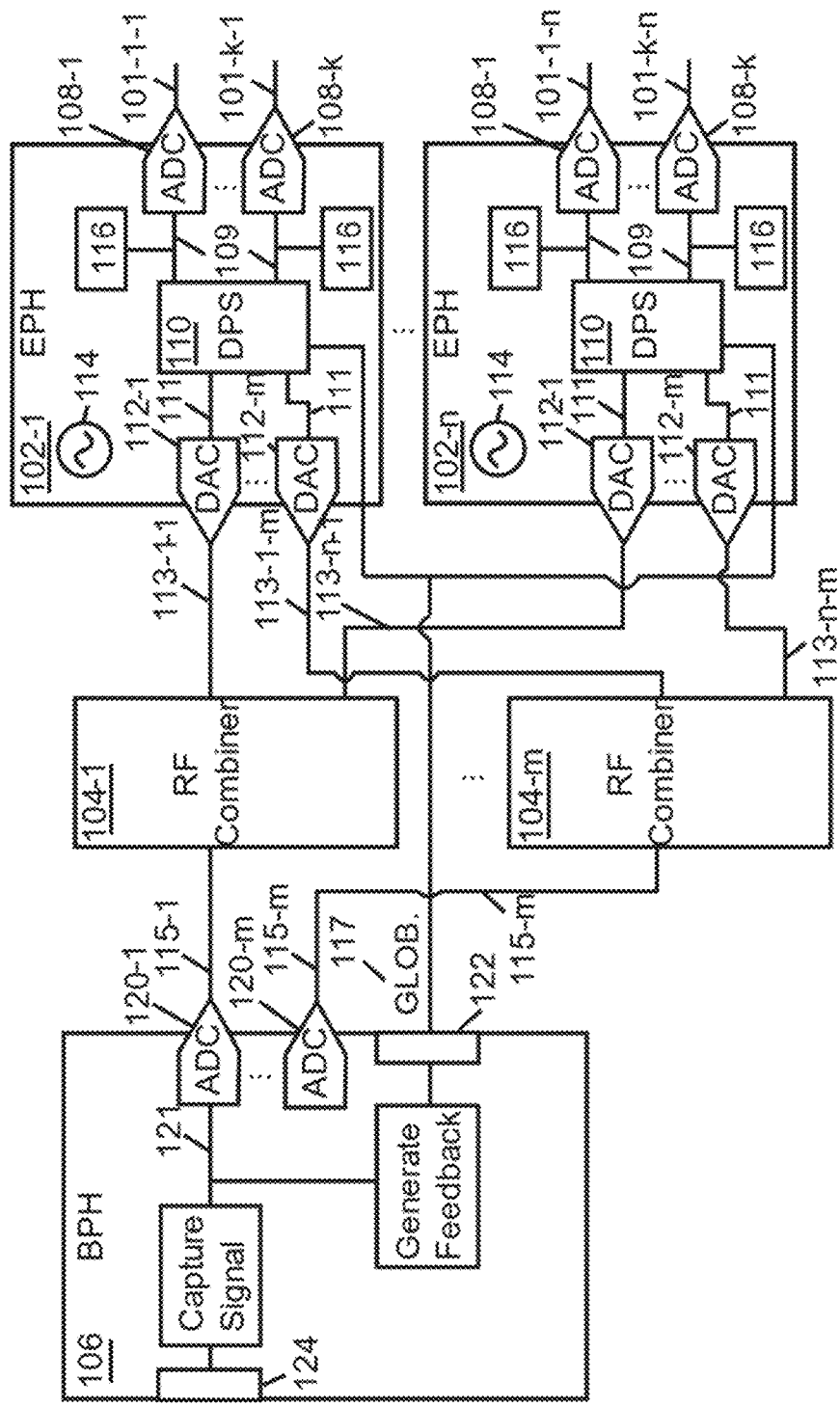
FIG. 1D depicts a block diagram of a digital beamformer, in accordance with one or more embodiments of the present disclosure.
Figure 1E:
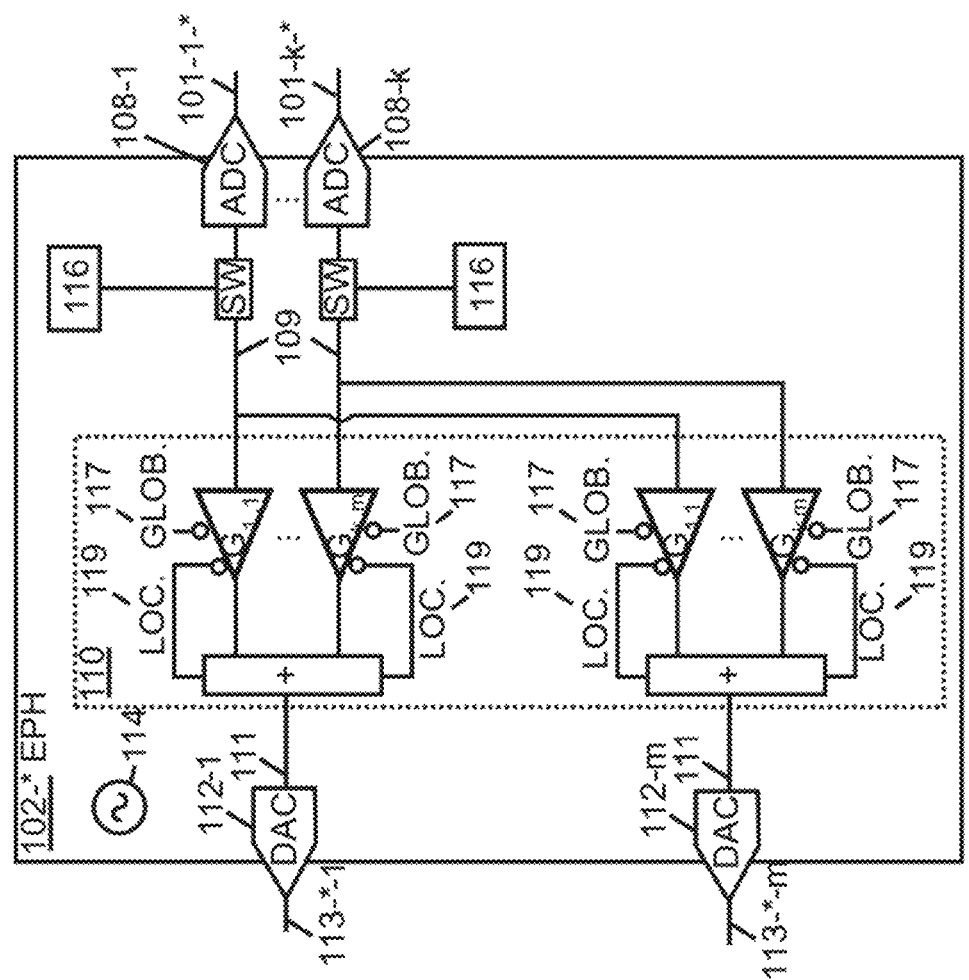
FIG. 1E depicts a block diagram of an element processing hardware of the digital beamformer of FIG. 1D, in accordance with one or more embodiments of the present disclosure.

Referring now in particular to FIGS. 1D-1E. In some embodiments, the digital beamformer 100 may multiplex the beams across frequency. In some embodiments, the digital phase shifter 110 independently applies the beamforming weights (e.g., $G_{1,1}$ through $G_{k,m}$) to the digital signals 109. The digital phase shifter 110 independently applies the beamforming weights to the digital signals 109 to generate a number (m) of summed digital signals 111, where m is an integer. The digital phase shifter 110 may form multiple beams simultaneously by which independently applies the beamforming weights to generate the summed digital signals 111. Each of the summed digital signals 111 includes a separate beam.

In some embodiments, each of the plurality of EPH 102 include a number (m) of the DAC 112, where m is an integer. The DACs 112 receive the digital signals 111 from the digital phase shifter 110. The number of DACs 112 control the beam-bandwidth product of the combined digital signal 121. For example, the number of DACs 112 may be increased to increase the beam-bandwidth product. The number of DACs 112 per EPH 102 times the bandwidth of the DACs 112 gives the total number of beams at whatever bandwidth the beams are received.

In some embodiments, the digital beamformer 100 includes a number (m) of the RF combiners 104. The number of the RF combiners 104 matches the number of the DACs 112 for each of the EPH 102. The RF combiners 104-(1-m) are coupled to respective of the DACs 112-(1-m). The RF combiners 104-(1-m) receive the analog signals 113 from the respective DACs.

Figure 2:
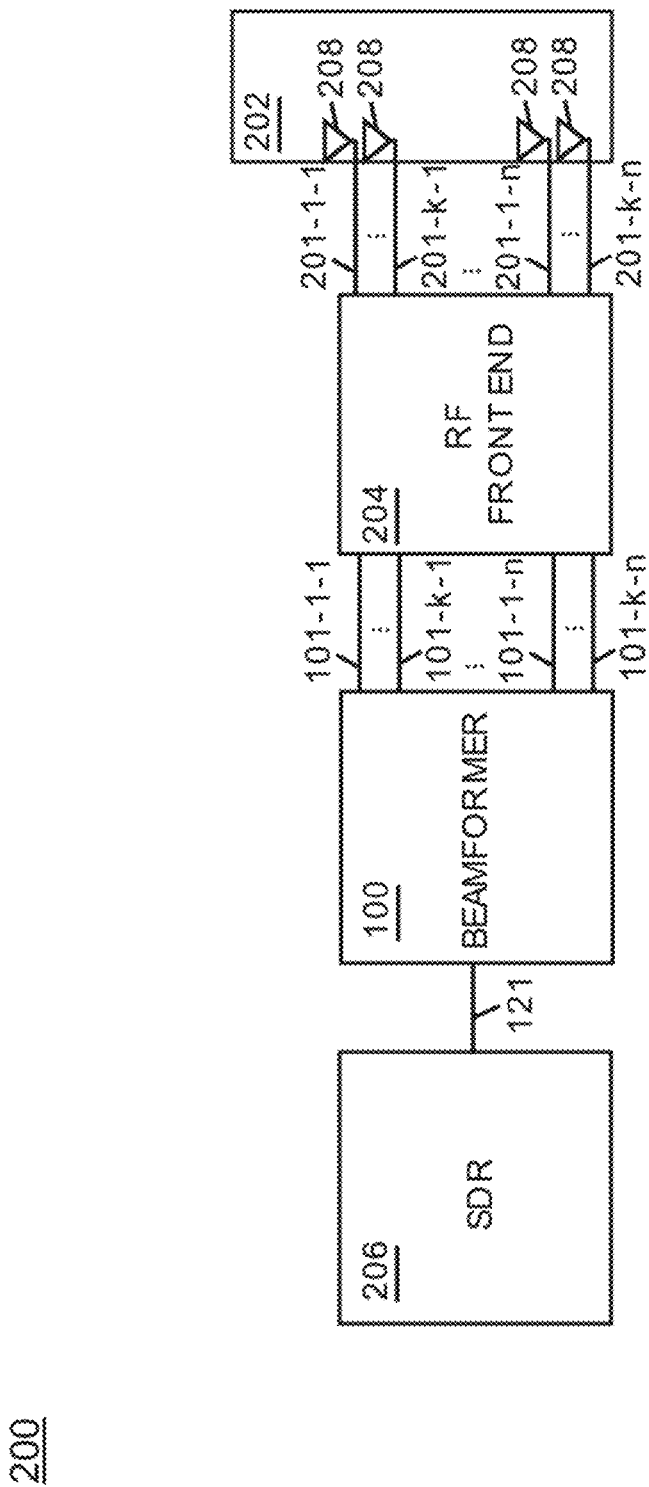
FIG. 2 depicts a radio system, in accordance with one or more embodiments of the present disclosure.

Referring now to FIGS. 2A-2B, a radio system 200 is described, in accordance with one or more embodiments of the present disclosure. The radio system 200 may also be referred to as a system for scalable adaptive digital beamforming of a phased antenna array. The radio system 200 may used for any purpose of beamforming, such as, communication, radar, sensing, and the like.

The radio system 200 includes one or more components, such as, but not limited to, the digital beamformer 100, an antenna array 202, an RF front end 204, a SDR 206, and the like.

The radio system 200 includes the antenna array 202. The antenna array 202 may also be referred to as a phased array. The antenna array 202 include antenna elements 208. The structural details of the antenna elements 208 are not intended to be limiting. The antenna elements 208 may include any type of antenna elements. The antenna elements 208 receive RF signals 201. The RF signals 201 may be wideband RF signals received across a wideband of frequencies.

In some embodiments, the radio system 200 includes the RF front end 204. The RF front end 204 is coupled between the antenna array 202 and the digital beamformer 100. The RF front end 204 receives the RF signals 201. The RF front end 204 converts the RF signals 201 to the analog signals 101. The RF front end 204 may perform one or more functions, such as, but not limited to, filtering, down converting, low-noise amplifying, and the like.

Although the radio system 200 is described as including the RF front end 204, this is not intended as a limitation of the present disclosure. It is contemplated that the digital beamformer may receive the RF signals as the analog signals 101. Beamforming can be realized in either radio frequency (RF) domain or baseband (BB) domain. However, the RF front end 204 enables a wider frequency coverage.

In some embodiments, the radio system 200 includes the SDR 206. The SDR 206 is connected to the digital beamformer 100. In particular, the SDR 206 is connected to the BPH 106. For example, the SDR 206 is connected to the digital interface 124 of the BPH 106. The SDR 206 receives the combined digital signal 121 from the BPH 106.

The SDR 206 may perform one or more functions. For example, the SDR 206 may act as a waveform processor, performing actions such as demodulation of the combined digital signal 121.

Although the radio system 200 is described as including the SDR 206 connected to the BPH 106, this is not intended as a limitation of the present disclosure. In some embodiments, the BPH may perform the functions of the SDR 206. For example, the BPH 106 may act as a waveform processor, performing actions such as demodulation of the combined digital signal 121.

Figure 3A:
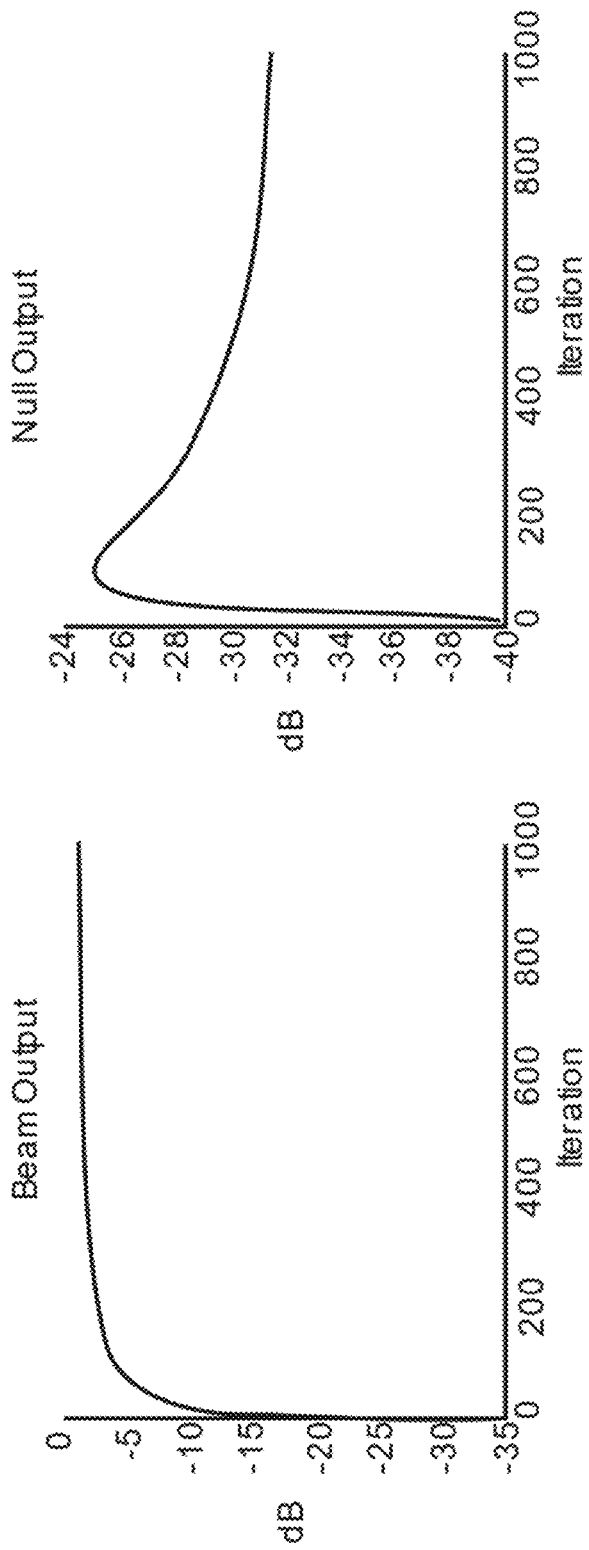
FIG. 3A-3B depict simulation results, in accordance with one or more embodiments of the present disclosure.
Figure 3B:
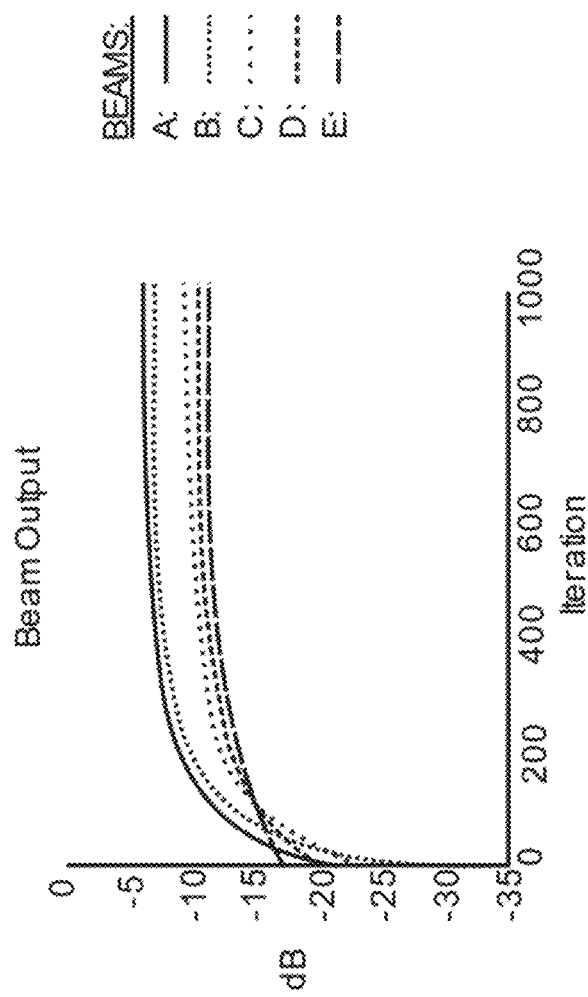

Referring now to FIGS. 3A-3B, simulation results are now described, in accordance with one or more embodiments of the present disclosure. The simulation results are described where the antenna array 202 is a 16×16 element array. The digital beamformer 100 may form nulls and beams using the 16×16 element array.

Referring to FIG. 3A the digital beamformer 100 may simultaneously form a null and a beam. The y-axis depicts a normalized beam/null amplitude in dB. The x-axis depicts the number of iterations of adapting the beamforming weights. The beam and null are formed at the same time during the iterations. When pointing the beam, the gain of the null initially increases. After the beam is pointed, the gain of the null then decreases. The gain of the null may be decreased while maintaining or increasing the gain of the beam.

Referring to FIG. 3B the digital beamformer 100 may simultaneously form multiple beams. For example, the digital beamformer 100 simultaneously form beams A-E. The y-axis depicts a normalized beam amplitude in dB. The x-axis depicts the number of iterations of adapting the beamforming weights. The beamforming weights are selected to balance the gain for each of the beams in parallel during the iterations.

Referring generally again to FIGS. 1A-3B. In some embodiments, the digital beamformer 100 does not comprise an analog time shifter and does not comprise an analog phase shifter. The digital beamformer 100 is considered a digital beamformer and not a hybrid beamformer or an analog beamformer. The digital beamformer 100 is not a hybrid beamformer or an analog beamformer because the digital beamformer 100 does not perform time delays or phase shifts on analog signals. In a hybrid beamformer, the hybrid beamformer includes an analog circuit between the ADC and the antenna elements. The analog circuit performs time delay, true time delay beamforming, and/or phase shifting on analog signals. The analog signals are then reduced to a reasonable number of RF signals that go into digital beamformers of the hybrid beamformer via the ADC. The digital beamforming inputs then remain in the digital domain for performing additional time delays or phase shifts. Thus, the hybrid beamformer includes both analog and digital time delay/phase shifts.

In some embodiments, each of the EPH 102 are an application-specific integrated circuit (ASIC). The ASICs may be populated onto one or more common circuit cards. The complexity of the logic on the EPH 102 is extremely low. The types of optimization algorithms that would be implemented require only a small number of multiply/accumulate operations. The primary size, weight, power, and cost (SWAP-C) driver will be the selection of ADC 108 and DAC 112. In some embodiments, a size and complexity of the EPH 102 is relatively small compared to the BPH 106.

In some embodiments, the RF combiner 104 is a circuit card. The complexity of the RF combiner 104 is extremely low. Compared to digital methods, an RF interface requires less logic to implement on both the EPH 102 and BPH 106. Additionally, state-of-the-art computing devices with sufficient digital bandwidth for combining thousands of signals do not exist. It is further noted that the losses incurred by the RF combiner 104 are like the losses that would be incurred by using a digital interface with lossy compression. Additionally, the RF combiner 104 is significantly lower cost when compared to optical combiners.

In some embodiments, the BPH 106 is a circuit card. The complexity of the BPH 106 is extremely low. Rather than being comparable to the complexity of a typical digital beamformer, the BPH 106 is comparable to the complexity of a typical software-defined radio receiver. For example, the complexity of the BPH 106 is low given that the BPH 106 does not perform covariance matrix inversion or the like.

In some embodiments, each of the EPH 102 include different RF frequency coverages.

In some embodiments, the digital phase shifter 110 may perform time delays on the digital signals 109. Shifting the phase and/or time between the digital signals 109 may allow for detection and synchronization of the nulls.

In some embodiments, the digital beamformer 100 is configured to perform null steering. Null steering refers to controlling the direction of nulls in the radiation pattern. The nulls are directed towards interfering signals.

Although much of the present disclosure is described in the context of the digital beamformer 100 receiving signals, this is not intended as a limitation of the present disclosure. The digital beamformer 100 may also be used to transmit signals. The principles of receiving the signals may be applied to transmitting the signals. In some embodiments, the digital beamformer 100 may learn the beamformer weights in receive. The digital beamformer may then adapt the signals in transmit based on the beamformer weights in receive. For example, the digital beamformer may adapt the signals in transmit using a complex conjugate of the beamformer weights in receive. The digital beamformer 100 may then supply the adapted signals to the RF front end and/or the antenna elements. In some embodiments, the EPH 102 may also contain one or more Channel DACs, one or more Beamformer ADCs, and one or more RF Splitters (RFS) which allow beamforming weights to applied to transmit signals.

The RF combiner 104 may be used to combine and to split, depending on the direction in which the RF power is applied to the RF combiner 104. Much of the present disclosure is described in the context of the beamformer 100 receiving signals, such that the RF combiner 104 combines signals from the EPH 102 and outputs the combined signal to the BPH 106. It is further contemplated that the RF combiner 104 the beamformer 100 may transmit signals, such that the RF combiner 104 acts to splits a signal from the BPH 106 and outputs the split signals to the EPH 102.

In some embodiments, the BPH 106 may perform pulse detection on each of the analog signals 101. For example, the global feedback 117 may cause the EPH 102 to sequentially null the analog signals 101. The BPH 106 may then detect pulses from each of the analog signals.

For a large numbers of EPHs 102, the EPHs 102 may need to reduce the output power of the analog signals 113 to adhere to the specifications of the RF combiner 104. The reduction in power may be achieved in the digital or analog domain.

Although the antenna array 202 is described as a 16×16 element array, this is not intended as a limitation of the present disclosure. It is contemplated that the antenna array

202 may include a larger array. For example, the antenna array 202 may be a 256×256 element array. The digital beamformer 100 may form nulls for one-hundred independent targets using the 256×256 element array. After 500 iterations, the digital beamformer 100 may achieve between 55 and 60 dB of null suppression for the one-hundred independent targets.

Processing hardware (e.g., EPH, BPH) may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the processing hardware may include any device configured to execute algorithms and/or instructions (e.g., program instructions stored in memory). Moreover, processing hardware may include a processor or logic elements suitable for carrying out at least a portion of the steps described in the present disclosure. Therefore, the above description should not be interpreted as a limitation on the embodiments of the present disclosure but merely as an illustration.

The processing hardware may include any storage medium known in the art suitable for storing program instructions executable by the associated one or more processors. For example, the memory medium may include a non-transitory memory medium. By way of another example, the memory medium may include, but is not limited to, a read-only memory (ROM), a random-access memory (RAM), a magnetic or optical memory device (e.g., disk), a magnetic tape, a solid-state drive and the like. It is further noted that memory medium may be housed in a housing with the one or more processors.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the methods described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mixable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A digital beamformer comprising:
   a plurality of element processing hardware; wherein each of the plurality of element processing hardware comprise:
      a plurality of analog-to-digital converters; wherein the plurality of analog-to-digital converters generate a plurality of digital signals;
      a digital phase shifter; wherein the digital phase shifter multiplies the plurality of digital signals by a plurality of beamforming weights; wherein the digital phase shifter sums the plurality of digital signals in response to multiplying by the plurality of beamforming weights to generate a summed digital signal; and
      a digital-to-analog converter; wherein the digital-to-analog converter converts the summed digital signal to a summed analog signal;
   a radio frequency combiner; wherein the radio frequency combiner combines the summed analog signal from each of the plurality of element processing hardware to generate a combined analog signal;
   a beam processing hardware; wherein the plurality of element processing hardware converts the combined analog signal to a combined digital signal; wherein the beam processing hardware generates a global feedback based on the combined digital signal;
   wherein the digital phase shifter of each of the plurality of element processing hardware adapts the plurality of beamforming weights based on the global feedback.

2. The digital beamformer of claim 1, wherein the plurality of beamforming weights are complex numbers; wherein the digital phase shifter changes both an amplitude and a phase of the plurality of digital signals when multiplying the plurality of digital signals by the beamforming weights.

3. The digital beamformer of claim 2, wherein adapting the plurality of beamforming weights changes the amplitude and the phase of the plurality of digital signals.

4. The digital beamformer of claim 3, wherein the digital phase shifter of each of the plurality of element processing hardware generate local feedback from the summed digital signal; wherein the digital phase shifter of each of the plurality of element processing hardware adapts the plurality of beamforming weights based on the global feedback and the local feedback.

5. The digital beamformer of claim 2, wherein the digital phase shifter iteratively adapts the plurality of beamforming weights for each of the plurality of digital signals as the plurality of digital signals are received from the plurality of analog-to-digital converters in real-time.

6. The digital beamformer of claim 2, wherein each of the plurality of element processing hardware comprise a band-storage memory; wherein the plurality of digital signals are stored in the band-storage memory; wherein the digital phase shifter iteratively adapts the beamforming weights for the plurality of digital signals stored in the band-storage memory.

7. The digital beamformer of claim 1, wherein each of the plurality of element processing hardware comprise a local oscillator; wherein the local oscillator generates a clock signal; wherein the plurality of analog-to-digital converters and the digital-to-analog converter each use the clock signal for timing.

8. The digital beamformer of claim 7, wherein the clock signal for each of the plurality of element processing hardware are not synchronized.

9. The digital beamformer of claim 1, wherein the plurality of element processing hardware are not in communication.

10. The digital beamformer of claim 1, wherein the digital phase shifter of each of the plurality of element processing hardware adapts the plurality of beamforming weights using an optimization algorithm.

11. The digital beamformer of claim 10, wherein the optimization algorithm comprises one of a gradient ascent algorithm, a gradient descent algorithm, a machine learning algorithm, or a pseudo-random guesses algorithm.

12. The digital beamformer of claim 10, wherein the plurality of element processing hardware independently perform the optimization algorithm to adapt the plurality of beamforming weights.

13. The digital beamformer of claim 1, wherein the combined digital signal comprises a radiation pattern comprising a plurality of nulls and a plurality of beams; wherein the digital phase shifter adapts the plurality of beamforming weights to form the plurality of beams and the plurality of nulls.

14. The digital beamformer of claim 13, wherein the digital beamformer is configured to simultaneously steer the plurality of beams and the plurality of nulls in azimuth and in elevation.

15. The digital beamformer of claim 13, wherein the digital beamformer multiplexes the plurality of beams across frequency; wherein the digital phase shifter comprises a polyphase filter bank.

16. The digital beamformer of claim 1, wherein each of the plurality of element processing hardware comprise a plurality of the analog-to-digital converters; wherein the digital beamformer comprises a plurality of the radio frequency combiners; wherein the plurality of radio frequency combiners are coupled to respective of the plurality of analog-to-digital converters.

17. A radio system comprising:
   an antenna array; and
   a digital beamformer comprising:
      a plurality of element processing hardware; wherein each of the plurality of element processing hardware comprise:
         a plurality of analog-to-digital converters; wherein the plurality of analog-to-digital converters generate a plurality of digital signals;
         a digital phase shifter; wherein the digital phase shifter multiplies the plurality of digital signals by a plurality of beamforming weights; wherein the digital phase shifter sums the plurality of digital signals in response to multiplying by the plurality of beamforming weights to generate a summed digital signal; and
         a digital-to-analog converter; wherein the digital-to-analog converter converts the summed digital signal to a summed analog signal;
      a radio frequency combiner; wherein the radio frequency combiner combines the summed analog signal from each of the plurality of element processing hardware to generate a combined analog signal;
      a beam processing hardware; wherein the plurality of element processing hardware converts the combined analog signal to a combined digital signal; wherein the beam processing hardware generates a global feedback based on the combined digital signal;
      wherein the digital phase shifter of each of the plurality of element processing hardware adapts the plurality of beamforming weights based on the global feedback.

18. The radio system of claim 17, comprising a software defined radio; wherein the software defined radio is coupled to the digital beamformer.

19. The radio system of claim 17, comprising a radio frequency front end; wherein the radio frequency front end is coupled between the antenna array and the digital beamformer.

* * * * *